United States Patent
Shiromizu et al.

(10) Patent No.: US 10,054,952 B2
(45) Date of Patent: Aug. 21, 2018

(54) AUTOMATIC OPERATION VEHICLE

(71) Applicant: HONDA MOTOR CO., LTD., Tokyo (JP)

(72) Inventors: Yasuyuki Shiromizu, Hino (JP); Tsutomu Mizoroke, Wako (JP); Makoto Yamanaka, Wako (JP); Yoshihisa Hirose, Wako (JP); Minami Kigami, Wako (JP); Kensei Yamashita, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 15/459,914

(22) Filed: Mar. 15, 2017

(65) Prior Publication Data

US 2017/0269603 A1    Sep. 21, 2017

(30) Foreign Application Priority Data

Mar. 18, 2016 (JP) .................. 2016-055416

(51) Int. Cl.
| | |
|---|---|
| G05D 1/02 | (2006.01) |
| A01D 34/00 | (2006.01) |
| G05D 1/00 | (2006.01) |
| A01D 101/00 | (2006.01) |
| G06T 7/70 | (2017.01) |

(52) U.S. Cl.
CPC ......... *G05D 1/0234* (2013.01); *A01D 34/008* (2013.01); *G05D 1/0088* (2013.01); *G05D 1/0219* (2013.01); *G05D 1/0221* (2013.01); *G05D 1/0246* (2013.01); *G05D 1/0274* (2013.01); *A01D 2101/00* (2013.01); *G05D 2201/0208* (2013.01); *G06T 7/70* (2017.01)

(58) Field of Classification Search
CPC .... G05D 1/034; G05D 1/0088; G05D 1/0219; G05D 1/0221; G05D 1/0246; G05D 1/0274; G05D 2201/0208
USPC .......................................................... 701/28
See application file for complete search history.

(56) References Cited

U.S. PATENT DOCUMENTS

| | | | |
|---|---|---|---|
| 4,905,151 A | 2/1990 | Weiman et al. | |
| 2015/0271991 A1 | 10/2015 | Balutis | |
| 2017/0225891 A1* | 8/2017 | Elazary | ................. B65G 1/137 |

OTHER PUBLICATIONS

Extended European Search Reported dated Aug. 24, 2017, issued in corresponding European Application No. 17160871.4. (7 pages).

(Continued)

*Primary Examiner* — Marthe Y Marc-Coleman
(74) *Attorney, Agent, or Firm* — Fitzpatrick, Cella, Harper & Scinto

(57) ABSTRACT

An automatic operation vehicle that automatically performs an operation in an operation area is provided. The vehicle includes a moving direction determination unit configured to determine a moving direction of the vehicle, an image analysis unit configured to extract a marker included in an image captured by a camera provided on the vehicle, and a survey unit configured to acquire, by triangulation, position information of the marker extracted by the image analysis unit. When the survey unit starts acquiring the position information of the marker, the moving direction determination unit determines, as the moving direction, a direction in which the vehicle does not come into contact with the marker, and an angle difference with respect to a direction from a current position of the vehicle to the marker is smaller than 90°.

6 Claims, 14 Drawing Sheets

(56) References Cited

OTHER PUBLICATIONS

Costa et al.; "Bearing-only Landmark Initialization with Unknown Data Association"; Robotic and Automation, 2004; Apr. 26, 2004; p. 1764-1770.
Office Action dated May 25, 2018, in European Patent Application No. 17160871.4.

* cited by examiner

AUTOMATIC OPERATION VEHICLE

CROSS-REFERENCE TO RELATED APPLICATION

This application is based upon and claims the benefit of priority from the prior Japanese Patent Application No. 2016-055416, filed on Mar. 18, 2016, the entire contents of which are incorporated herein by reference.

BACKGROUND OF THE INVENTION

Field of the Invention

The present invention relates to an automatic operation vehicle. The present invention particularly relates to an automatic operation vehicle capable of reducing the labor of a user in setting an operation area in which the automatic operation vehicle performs an operation.

Description of the Related Art

There is conventionally proposed an automatic operation vehicle that is equipped with an operation device such as a mowing blade and actuates the operation device while automatically traveling in a set operation area. The operation area in which the automatic operation vehicle automatically travels is set by, for example, placing a physical barrier such as a wire by a user. For this reason, if the automatic operation vehicle contacts the physical barrier, it changes the direction by, for example, turning not to travel outside the operation area.

To set the operation area by the physical barrier, the user needs to place the physical barrier such as a wire throughout the boundary between the inside and the outside of the operation area to a height to contact the automatic operation vehicle. U.S. Patent Application Publication No. 2015/0271991 discloses a robot mower (automatic operation vehicle) that need not a physical barrier and can store the position information of the boundary between the inside and the outside of an operation area.

This automatic operation vehicle is provided with a handle grippable by a user. The user can grip the handle and guide the traveling of the automatic operation vehicle. While the user is guiding the traveling of the automatic operation vehicle along the boundary between the inside and the outside of an operation area, the automatic operation vehicle acquires and stores the current position of its own, thereby storing the position of the boundary.

After storing the boundary between the inside and the outside of the operation area, the automatic operation vehicle compares the current position of its own with the position of the boundary between the inside and the outside of the operation area, thereby implementing traveling only in the operation area. Hence, for this automatic operation vehicle, the user need not place a physical barrier such as a wire throughout the boundary between the inside and the outside of the operation area.

However, to set the operation area for the automatic operation vehicle, the user needs to guide the traveling of the automatic operation vehicle along the boundary between the inside and the outside of the operation area. For this reason, the present inventors recognized that there is room for improvement of an existing automatic operation vehicle to reduce the labor of a user in setting an operation area.

SUMMARY OF THE INVENTION

An aspect of the present invention provides an automatic operation vehicle capable of reducing the labor of a user in setting an operation area in which the automatic operation vehicle performs an operation. Other aspects of the present invention will be apparent to those skilled in the art by referring to embodiments to be described below and the accompanying drawings.

According to some embodiments of the present invention, an automatic operation vehicle that automatically performs an operation in an operation area is provided. The vehicle comprises: a moving direction determination unit configured to determine a moving direction of the automatic operation vehicle; an image analysis unit configured to extract a marker included in an image captured by a camera provided on the automatic operation vehicle; and a survey unit configured to acquire, by triangulation, position information of the marker extracted by the image analysis unit. When the survey unit starts acquiring the position information of the marker, the moving direction determination unit determines, as the moving direction, a direction in which the automatic operation vehicle does not come into contact with the marker, and an angle difference with respect to a direction from a current position of the automatic operation vehicle to the marker is smaller than 90°.

Further features of the present invention will become apparent from the following description of exemplary embodiments (with reference to the attached drawings).

DESCRIPTION OF THE EMBODIMENTS

Embodiments to be described below are used to easily understand the present invention. Hence, those skilled in the art should remember that the present invention is not improperly limited by the embodiments to be explained below.

1. Arrangement Example of Automatic Operation Vehicle

Figure 1:
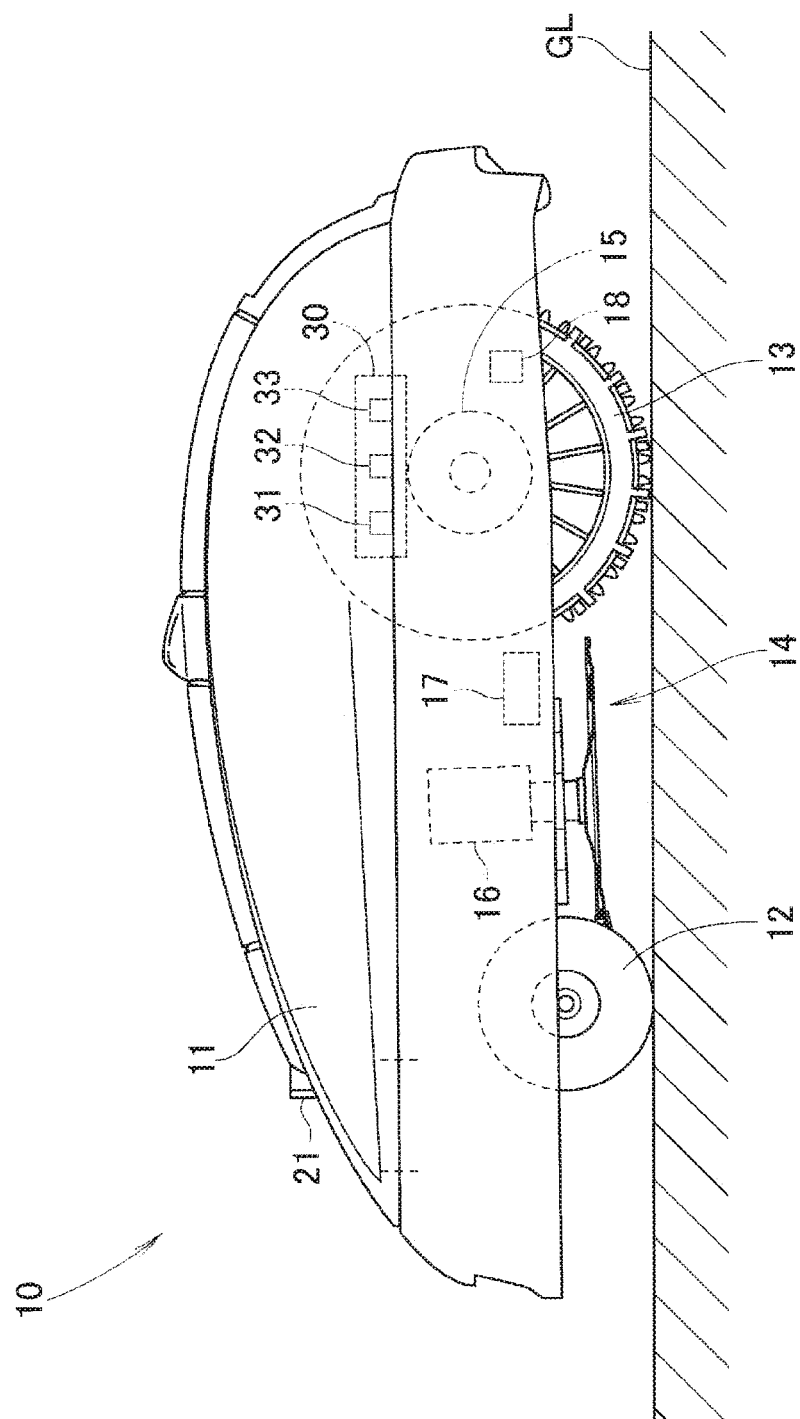
FIG. 1 is a side view showing an example of the overall arrangement of an automatic operation vehicle according to some embodiments of the present invention.

An example of the overall arrangement of an automatic operation vehicle 10 will be described with reference to FIGS. 1 and 2. The automatic operation vehicle 10 will also be referred to as the operation vehicle 10 hereinafter. As an example of the operation vehicle 10, FIG. 1 shows a robot mower capable of autonomously traveling to mow a lawn. The operation vehicle 10 includes a housing 11, left and right front wheels 12 provided on the front side of the housing 11, left and right rear wheels 13 provided on the rear side of the housing 11, and an operation unit 14 provided on the lower side at the center of the housing 11. In the example shown in FIG. 1, a mowing blade is shown as an example of the operation unit 14 in the case in which the operation vehicle 10 is a robot mower.

The operation vehicle 10 includes, in the housing 11, left and right traveling motors 15 that individually drive the left and right rear wheels 13, a driving motor 16 that drives the operation unit 14, a battery 17, a wheel speed sensor 18, and a circuit board 30 on which an ECU (Electronic Control Unit) 31, an angular velocity sensor 32, and an acceleration sensor 33 are mounted. The operation vehicle 10 also has, on the housing 11, a camera 21 capable of capturing the outside of the operation vehicle 10. The camera 21 includes, for example, an image sensor such as a CCD or CMOS sensor and an imaging lens configured to form an image of an object on the imaging plane of the image sensor, and can generate an image of a digital format.

The traveling motors 15, the driving motor 16, the wheel speed sensor 18, the ECU 31, the angular velocity sensor 32, the acceleration sensor 33, and the camera 21 receive power supplied from the battery 17. For example, the traveling motors 15, the driving motor 16, the wheel speed sensor 18, the angular velocity sensor 32, the acceleration sensor 33, and the camera 21 may receive power supplied from the battery 17 via the ECU 31.

The ECU 31 receives signals (or data) from the wheel speed sensor 18, the angular velocity sensor 32, the acceleration sensor 33, and the camera 21 and controls the operations of the traveling motors 15 and the driving motor 16. The ECU 31 individually controls the left and right traveling motors 15, thereby controlling the movement of the operation vehicle 10.

Figure 2:
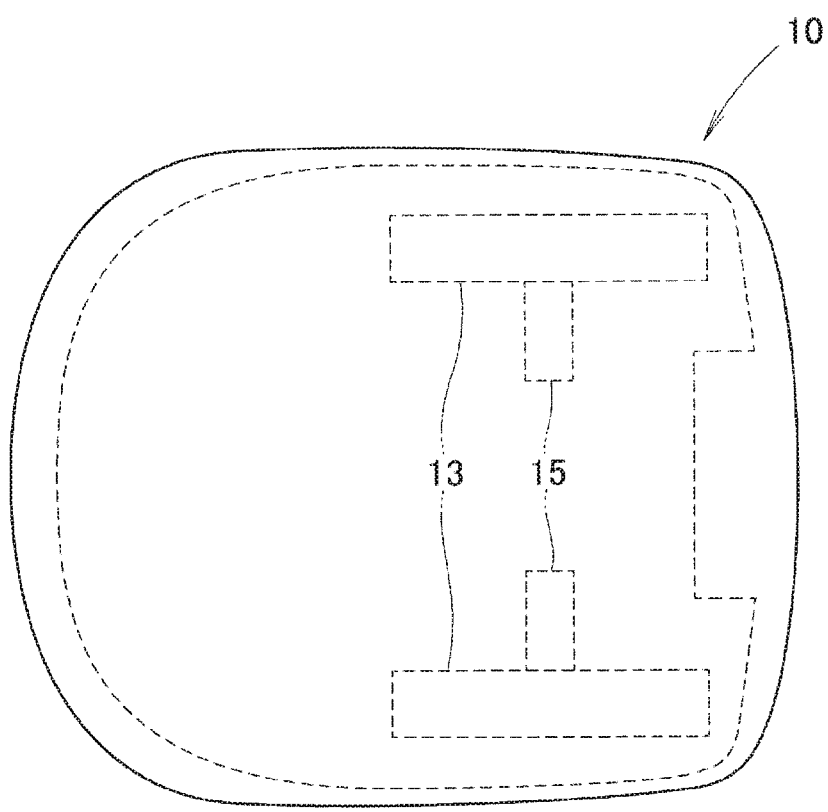
FIG. 2 is a plan view of the automatic operation vehicle shown in FIG. 1.

That is, as shown in FIG. 2, the left traveling motor 15 individually drives the left rear wheel 13, and the right traveling motor 15 individually drives the right rear wheel 13. For example, when both the left and right traveling motors 15 rotate in the forward direction at a uniform velocity, the operation vehicle 10 travels straight forward (moves ahead). Similarly, when both the left and right traveling motors 15 rotate in the reverse direction at a uniform velocity, the operation vehicle 10 travels straight backward (moves back).

If the traveling motor 15 on the left side and the traveling motor 15 on the right side rotate in the forward direction at different velocities, the operation vehicle 10 turns in the direction of the motor with the lower rotation speed out of the left and right traveling motors 15. If one of the left and right traveling motors 15 rotates in the forward direction, and the other rotates in the reverse direction at the same rotation speed, the operation vehicle 10 can turn in the direction of the reversely rotating motor out of the left and right traveling motors 15 without changing the position of the operation vehicle 10.

Figure 3:
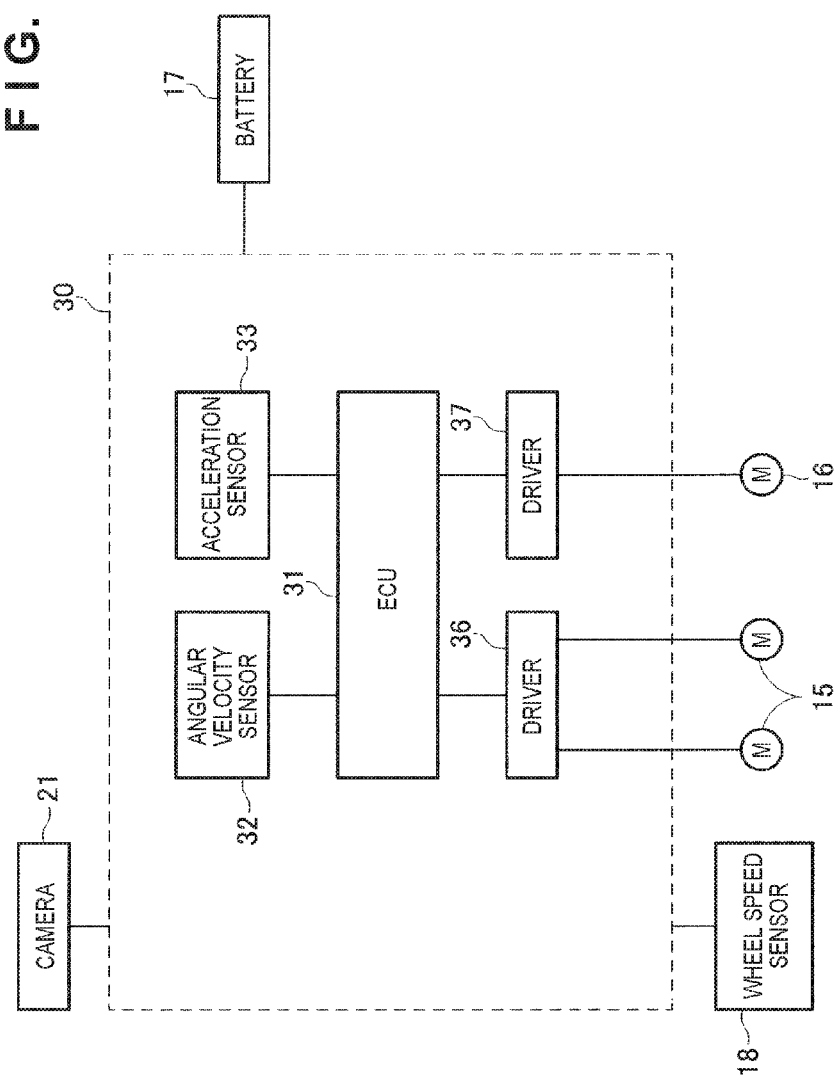
FIG. 3 is a block diagram showing an example of the arrangement of a circuit board shown in FIG. 1 and devices connected to the circuit board.

An example of the arrangement of the circuit board 30 and the devices connected to the circuit board 30 will be described with reference to FIG. 3. As shown in FIG. 3, the circuit board 30 includes the ECU 31, the angular velocity sensor 32, the acceleration sensor 33, a driver 36 that individually controls the rotations of the left and right traveling motors 15, and a driver 37 that controls the rotation of the driving motor 16. The circuit board 30 is electrically connected to the camera 21, the battery 17, and the wheel speed sensor 18.

The angular velocity sensor 32 outputs, to the ECU 31, a signal representing a yaw rate that is the turning angle velocity of the barycentric position (not shown) of the operation vehicle 10 about a vertical axis. That is, the ECU 31 receives the signal representing the yaw rate from the angular velocity sensor 32, thereby acquiring the front direction (traveling direction) of the operation vehicle 10 by a calculation or the like.

The acceleration sensor 33 outputs, to the ECU 31, a signal representing an acceleration acting in, for example, three directions, that is, the front-and-rear direction, the left-and-right direction, and the vertical direction of the operation vehicle 10. The acceleration sensor 33 need not always output a signal representing the acceleration acting in the three directions, and may output a signal representing an acceleration acting in, for example, one or two of the three directions.

The driver 36 individually controls the rotations of the left and right traveling motors 15 in accordance with a signal received from the ECU 31. The driver 37 controls the rotation of the driving motor 16 in accordance with a signal received from the ECU 31. In the example shown in FIG. 3, the angular velocity sensor 32, the acceleration sensor 33, the driver 36, and the driver 37 are provided on the circuit board 30 as constituent elements separated from the ECU 31. However, for example, the ECU 31 may include at least one of them.

The wheel speed sensor 18 is provided in the operation vehicle 10 to be able to detect the rotation speed of the rear wheels 13, and outputs a signal representing the rotation speed of the rear wheels 13 to the circuit board 30, more specifically, the ECU 31. That is, the ECU 31 receives the signal representing the rotation speed of the rear wheels 13 from the wheel speed sensor 18, thereby acquiring the distance of the movement of the operation vehicle 10 by a calculation or the like.

The camera 21 is provided on the operation vehicle 10 to be able to capture the outside of the operation vehicle 10, and outputs the data of a captured image to the circuit board 30, more specifically, the ECU 31. In the example shown in FIG. 3, one camera 21 is electrically connected to the circuit board 30. However, two or more cameras 21 may be connected to the circuit board 30.

Cameras 21 in an appropriate number may be provided at appropriate positions on the operation vehicle 10 so as to capture the whole circumference of the operation vehicle 10. For example, a total of four cameras 21 may be provided such that one camera 21 is arranged on each of the front, rear, left, and right sides of the housing 11 of the operation vehicle 10. Alternatively, for example, one camera 21 having an angle of view capable of capturing the whole circumference of the operation vehicle 10 may be provided on the upper portion of the housing 11 of the operation vehicle 10.

Figure 4:
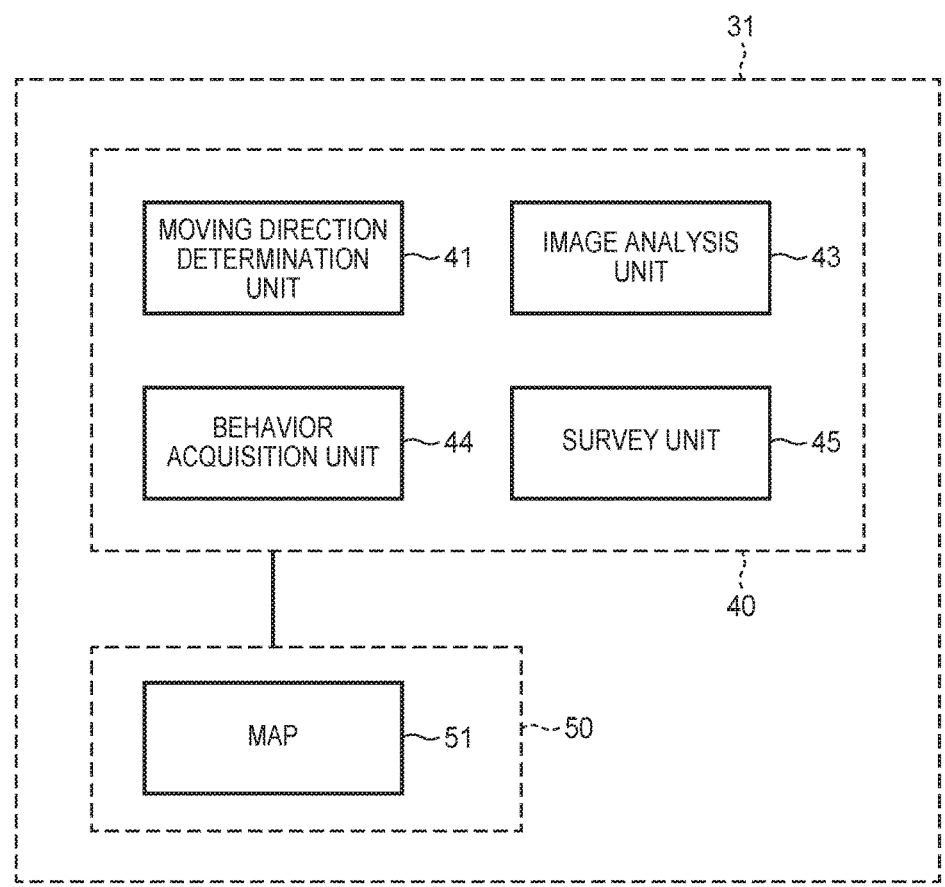
FIG. 4 is a block diagram showing an example of the arrangement of an electronic control unit shown in FIG. 3.

An example of the arrangement of the ECU 31 will be described with reference to FIG. 4. The ECU 31 is formed from, for example, a microcomputer including a processing unit 40 such as a CPU (Central Processing Unit), and a storage unit 50 such as a RAM (Random Access Memory) and a ROM (Read Only Memory). The storage unit 50 stores map data (map) 51 concerning an operation area that is a range where the operation vehicle 10 performs an operation.

The processing unit 40, for example, executes a program (not shown) stored in the storage unit 50, thereby functioning as a moving direction determination unit 41, an image analysis unit 43, a behavior acquisition unit 44, and a survey unit 45. Alternatively, at least one of the moving direction determination unit 41, the image analysis unit 43, the behavior acquisition unit 44, or the survey unit 45 may be implemented by, for example, hardware such as an analog circuit.

The moving direction determination unit 41 determines the direction (moving direction) to move the operation vehicle 10. The image analysis unit 43 receives an image obtained by capturing the outside of the operation vehicle 10 by the camera 21, and analyzes the image using, for example, known image processing and pattern matching methods. If the operation vehicle 10 includes a plurality of cameras 21, the image analysis unit 43 may analyze an image of the whole circumference of the operation vehicle 10, which is obtained by connecting captured images of the outside of the operation vehicle 10 received from the plurality of cameras 21. If the received image includes a marker (to be described later), the image analysis unit 43 extracts the marker. The image analysis unit 43 acquires the angle difference between the front direction (traveling direction) of the operation vehicle 10 and a direction indicating a marker extracted from the current position of the operation vehicle 10 by a calculation or the like.

The behavior acquisition unit 44 acquires behavior information including the distance and direction of the movement of the operation vehicle 10. The behavior acquisition unit 44 acquires the distance of the movement of the operation vehicle 10 in accordance with a signal received from the wheel speed sensor 18 by a calculation or the like. The behavior acquisition unit 44 also acquires the direction of the movement of the operation vehicle 10 in accordance with a signal received from the angular velocity sensor 32 by a calculation or the like. The behavior acquisition unit 44 may further include, in the behavior information, for example, information acquired according to a signal received from the acceleration sensor 33 by a calculation or the like.

The survey unit 45 acquires the position information of a marker extracted by the image analysis unit 43 by triangulation (to be described later) using the analysis result of the image analysis unit 43 and the behavior information obtained by the behavior acquisition unit 44. The survey unit 45, for example, reflects the obtained position information of the marker on the map 51.

As operation modes of the operation vehicle 10, the operation vehicle 10 has, for example, an operation mode and a survey mode. When operating in the operation mode, the operation vehicle 10 autonomously travels in the operation area and performs an operation of, for example, mowing a lawn. When operating in the survey mode, the operation vehicle 10 acquires the position information of a marker and updates the map 51 during autonomous traveling.

Figure 5:
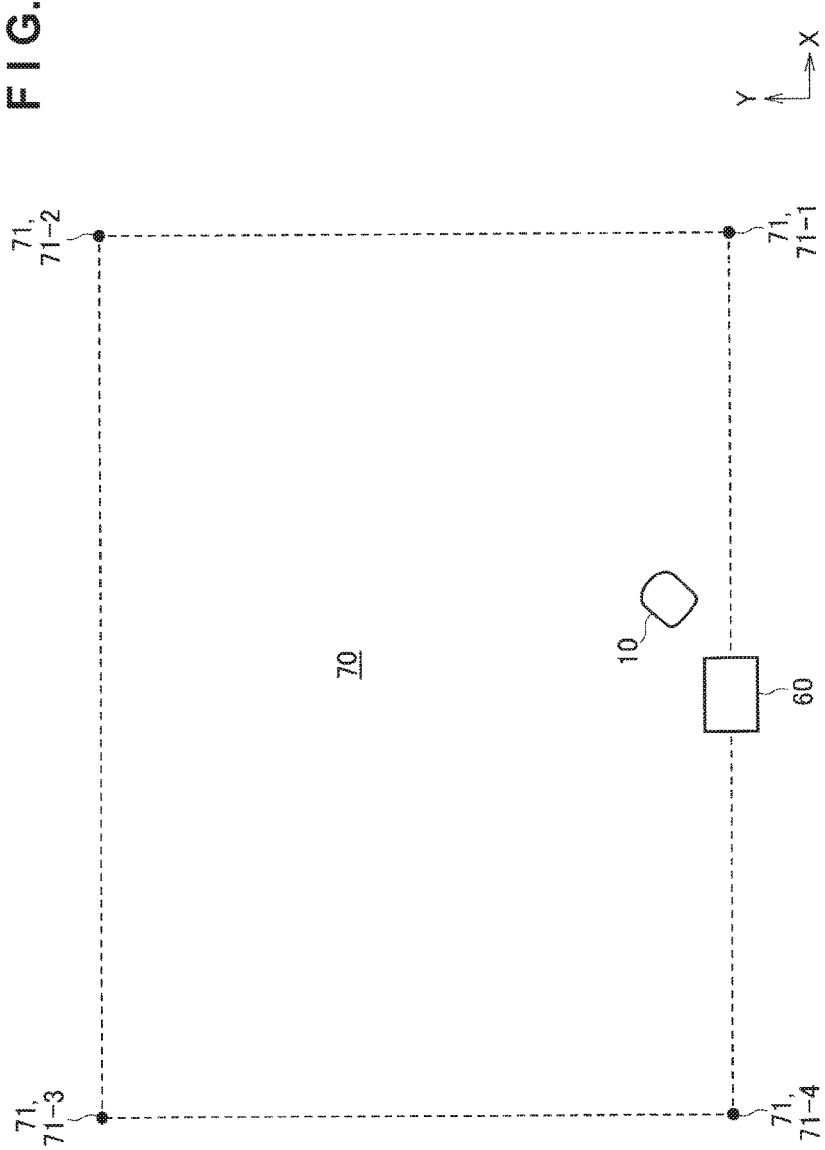
FIG. 5 is a view showing an example of the operation area of the automatic operation vehicle shown in FIG. 1.

2. Example of Operation of Automatic Operation Vehicle 2-1. Relationship Between Operation Area and Operation of Automatic Operation Vehicle The relationship between an operation area 70 and the operation of the operation vehicle 10 will be described with reference to FIG. 5. FIG. 5 shows an example in which the operation area 70 is viewed from above. In the example shown in FIG. 5, the operation area 70 is represented by a range surrounded by a broken line. In the example shown in FIG. 5, a station 60 capable of storing the operation vehicle 10 is illustrated. When stored in the station 60, the operation vehicle 10 can charge the battery 17. When the operation in the operation mode or the survey mode ends, the operation vehicle 10 may move to the station 60 and be stored. Note that in the example shown in FIG. 5, the station 60 is arranged across the boundary between the inside and the outside of the operation area 70. However, the station 60 may be arranged inside the operation area 70 or outside the operation area 70.

The operation vehicle 10 can set (or store) the operation area 70 on the map 51 stored in the storage unit 50 of the ECU 31. The map 51 is, for example, a two-dimensional map representing the same plane as the ground. Position information (two-dimensional coordinates) on the map 51 and position information (two-dimensional coordinates) on the real space have a correspondence relationship. The position information (two-dimensional coordinates) on the real space is represented by a coordinate plane on the same plane as the ground. The coordinate plane has its origin at a preset position or the position where the station 60 is arranged, and includes two coordinate axes, that is, an X-axis and a Y-axis intersecting the X-axis at a right angle. Note that in the example shown in FIG. 5, the origin and the X- and Y-axes are not illustrated, and an example in the X-axis positive direction and the Y-axis positive direction is shown.

In the example shown in FIG. 5, the rectangular operation area 70 is shown. Markers 71 (71-1, 71-2, 71-3, and 71-4) exist at the four apexes of the rectangle. That is, in the example shown in FIG. 5, the range inside a rectangle defined by four coordinate points corresponding to the positions of the four markers 71 (71-1, 71-2, 71-3, and 71-4) on the real space is set as the operation area 70 on the map 51.

As described above, the operation vehicle 10 can acquire, by the behavior acquisition unit 44 of the ECU 31, behavior information including the distance of the movement of the operation vehicle 10 and the direction of the movement of the operation vehicle 10. For this reason, the operation vehicle 10 can grasp the current position of the operation vehicle 10 on the map 51.

After setting the operation area 70 on the map 51 in this way, the operation vehicle 10 can travel only inside the operation area 70. As a result, when, for example, operating in the operation mode, the operation vehicle 10 can implement autonomously traveling only inside the operation area 70 and performing an operation of, for example, mowing a lawn.

To set the operation area 70 on the map 51, position information (two-dimensional coordinates) concerning the boundary between the inside and the outside of the operation area 70 on the real space needs to be grasped. In the operation vehicle 10, the survey unit 45 acquires the position information (two-dimensional coordinates) of each marker 71 on the real space by triangulation as the position information concerning the boundary between the inside and the outside of the operation area 70. Note that the user can edit the map 51. For example, a position spaced apart from the position information of the marker 71 reflected on the map 51 by an arbitrary distance may be set on the boundary between the inside and the outside of the operation area 70.

The marker 71 is an object that the image analysis unit 43 can extract from an image received from the camera 21, and may be, for example, a rod-shaped object capable of standing on the ground. A tree, a stone, or the like may be used as the marker 71 as long as the image analysis unit 43 can extract it from the image received from the camera 21. In addition, the marker 71 may be, for example, configured to be able to emit light in a specific frequency domain to be captured by the camera 21.

2-2. Acquisition of Position Information of Marker by Triangulation

Figure 6:
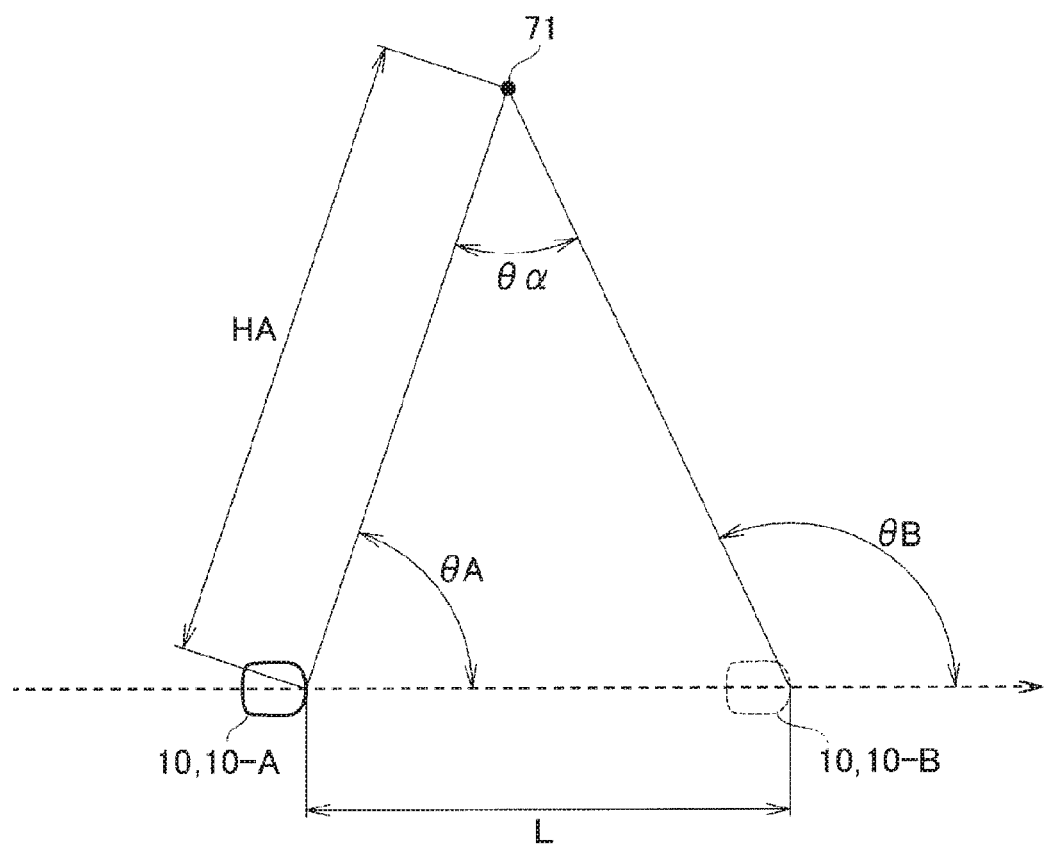
FIG. 6 is a view for explaining the principle of triangulation by a survey unit shown in FIG. 4.

An example of a method of acquiring the position information (two-dimensional coordinates) of the marker 71 using triangulation by the survey unit 45 will be described with reference to FIG. 6. FIG. 6 shows an example in which the operation vehicle 10 that moves in a constant direction and the marker 71 are viewed from above.

Let L be the distance between a position 10-A and a position 10-B, through which the operation vehicle 10 moving in the constant direction passes. Let HA be the distance of a line that connects the position 10-A and the position of the marker 71. Let θA be the angle made by the direction of the movement of the operation vehicle 10 and the line that connects the position 10-A and the position of the marker 71. Let θB be the angle made by the direction of the movement of the operation vehicle 10 and a line that connects the position 10-B and the position of the marker 71. Let θα be the angle made by the line that passes through the position 10-A and the position of the marker 71 and the line that passes through the position 10-B and the position of the marker 71. At this time, based on the sine theorem, we obtain $HA/\sin(\pi-\theta B) = L/\sin\theta\alpha$ $HA/\sin\theta B = L/\sin(\theta B - \theta A)$     (1)

$(\because \sin(\pi-\theta B) = \sin\theta B, \theta\alpha = \theta B - \theta A)$ In addition, equations (1) can be rewritten as $HA = L \cdot \sin\theta B / \sin(\theta B - \theta A)$     (2)

When L, θA, and θB are thus obtained, HA can be determined by calculating equation (2). Here, the survey unit 45 can obtain L, θA, and θB as the operation vehicle 10 moves in the constant direction from the position 10-A to the position 10-B. That is, L is acquired by the behavior acquisition unit 44, and θA and θB are acquired by the image analysis unit 43. Hence, the survey unit 45 can acquire information representing that the marker 71 is arranged at a position spaced part from the position 10-A by HA in a direction with the angle difference θA with respect to the front direction (traveling direction) of the operation vehicle 10 at the position 10-A. In the above-described way, the survey unit 45 acquires the position information (two-dimensional coordinates) of the marker 71.

Of two positions (corresponding to the positions 10-A and 10-B in FIG. 6) that the operation vehicle 10 passes through during a movement in a constant direction when the survey unit 45 acquires the position information of the marker 71 using triangulation, one will also be referred to as a first point (corresponding to the position 10-A in FIG. 6), and the other will also be referred to as a second point (corresponding to the position 10-B in FIG. 6). In addition, the angle difference between the moving direction and the direction from the first point to the marker 71 will also be referred to as a first angle (corresponding to the angle θA in FIG. 6), and the angle difference between the moving direction and the direction from the second point to the marker 71 will also be referred to as a second angle (corresponding to the angle θB in FIG. 6).

2-3. Example of Operation of Automatic Operation Vehicle in Survey Mode

Figure 7:
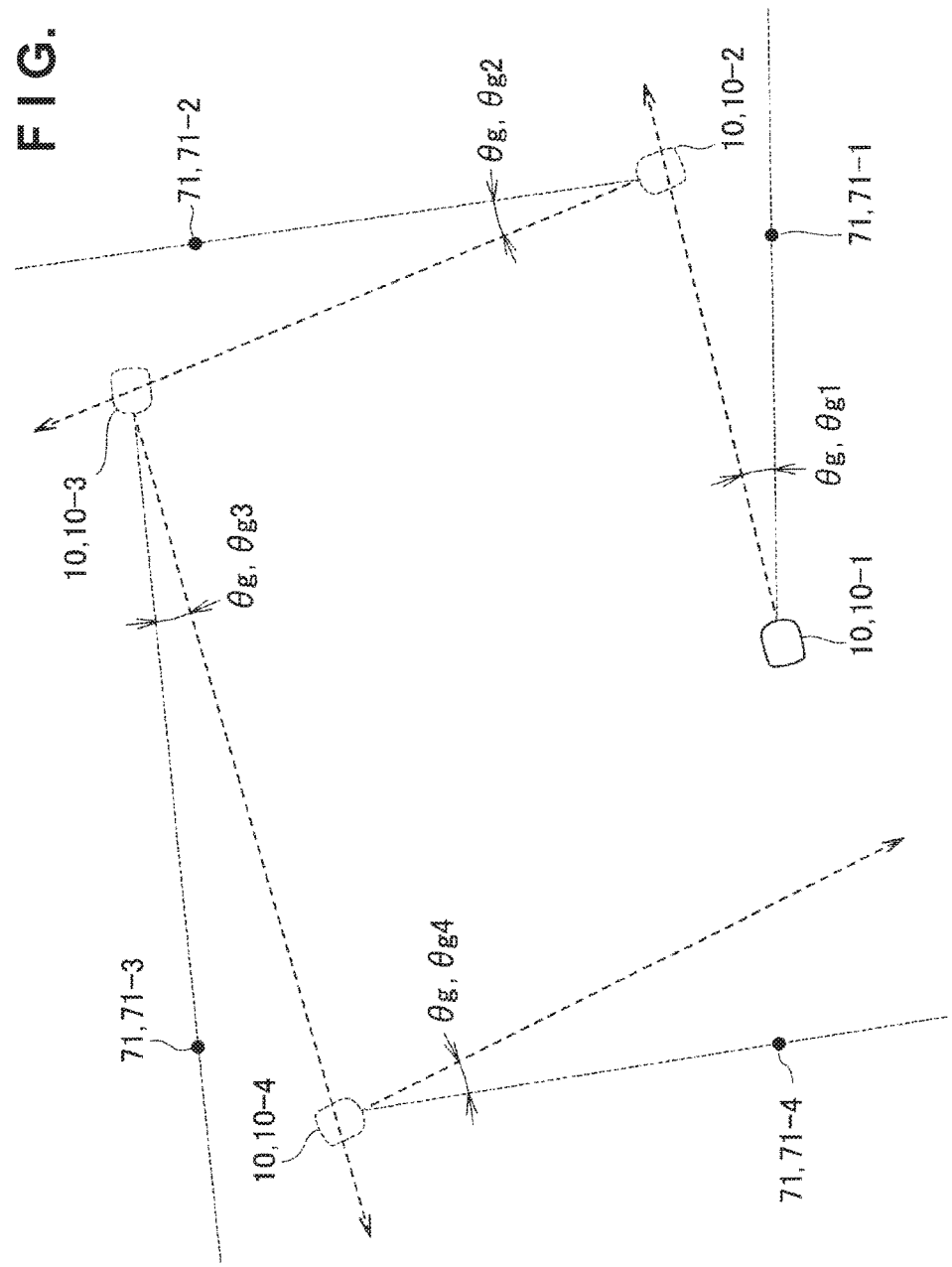
FIG. 7 is a view showing an example of the movement of the automatic operation vehicle shown in FIG. 1 when acquiring the position information of a plurality of markers.
Figure 8:
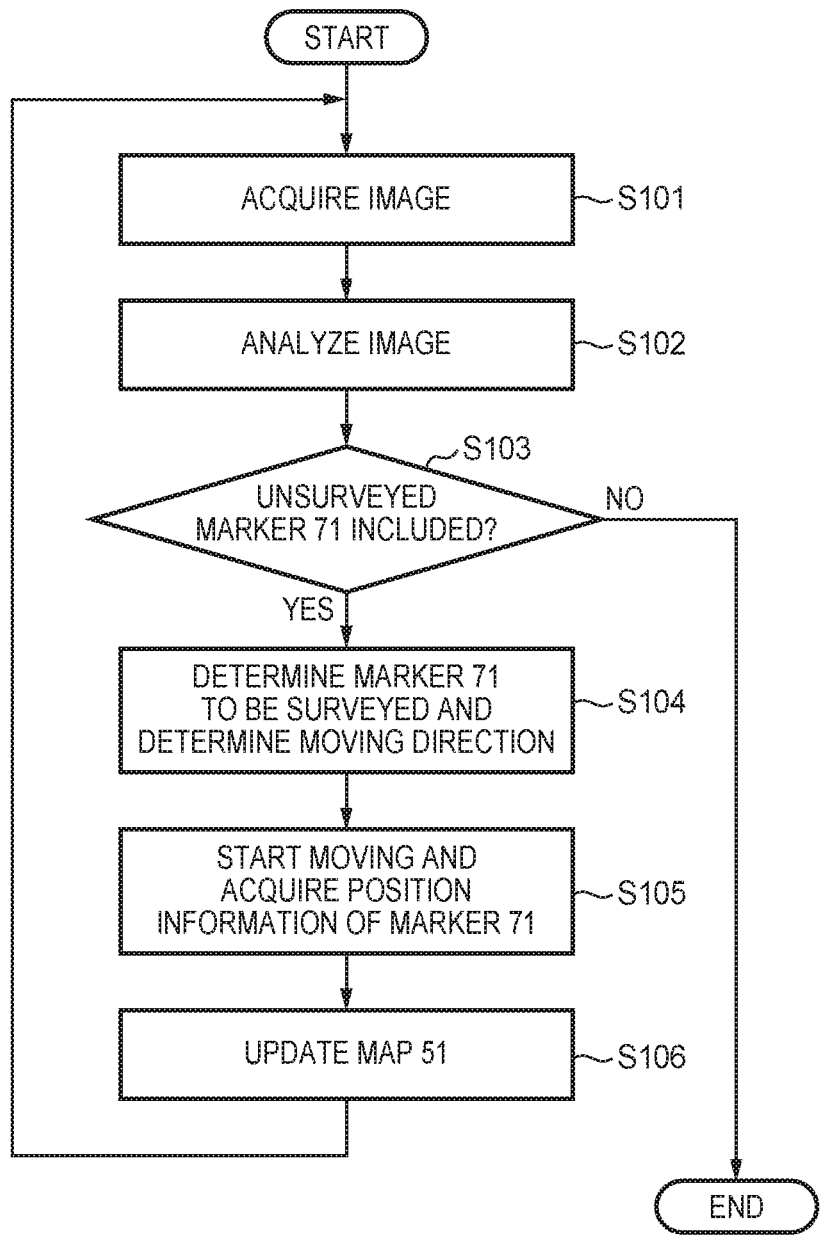
FIG. 8 is a flowchart showing an example of the operation of the automatic operation vehicle shown in FIG. 1 when acquiring the position information of the markers.

An example of the operation of the operation vehicle 10 in the survey mode will be described with reference to FIGS. 7 and 8. FIG. 7 shows an example in which the operation vehicle 10 and the four markers 71 (71-1, 71-2, 71-3, and 71-4) are viewed from above. In the example shown in FIG. 7, the operation vehicle 10 is assumed to start the survey mode at a position 10-1.

The operation vehicle 10 that has started execution of the survey mode captures the outside of the operation vehicle 10 by the camera 21 at the position 10-1. The image analysis unit 43 receives the image captured by the camera 21 and analyzes it. If the marker 71-1 is included in the analyzed image, the image analysis unit 43 extracts the marker 71-1. The survey unit 45 starts acquiring the position information of the marker 71-1 extracted by the image analysis unit 43.

For the marker 71-1 for which the survey unit 45 starts acquiring the position information, the moving direction determination unit 41 determines the moving direction in which the operation vehicle 10 moves to acquire the position information. That is, the moving direction determination unit 41 determines, as the moving direction of the operation vehicle 10, a direction in which the operation vehicle 10 does not come into contact with the marker 71 (marker 71-1), and an angle difference θg (θg1) with respect to the direction from the current position (position 10-1) of the operation vehicle 10 to the marker 71 (marker 71-1) is smaller than 90°.

When the moving direction determination unit 41 determines the moving direction of the operation vehicle 10, the operation vehicle 10 turns until the front direction (traveling direction) matches the moving direction determined by the moving direction determination unit 41. After the front direction (traveling direction) matches the moving direction determined by the moving direction determination unit 41, the operation vehicle 10 moves (moves ahead) in the front direction (traveling direction). During the movement of the operation vehicle 10, the survey unit 45 acquires the position information of the marker 71 (marker 71-1) by the above-described triangulation.

As described above, when the survey unit 45 starts acquiring the position information of the marker 71, the moving direction determination unit 41 determines the moving direction of the operation vehicle 10. This makes it possible to acquire the position information of the marker 71 without causing the user to acquire the position information of the marker 71 by himself/herself and guide the moving direction of the operation vehicle 10. In addition, since the moving direction determined by the moving direction determination unit 41 is a direction in which the operation vehicle 10 does not come into contact with the marker 71, and the angle difference θg with respect to the direction from the current position of the operation vehicle 10 to the marker 71 is smaller than 90°, a timing is generated at which the distance between the operation vehicle 10 and the marker 71 shortens during the movement of the operation vehicle 10 in the determined moving direction. That is, as compared to a case in which the operation vehicle 10 moves in a direction in which the angle difference θg with respect to the direction from the current position of the operation vehicle 10 to the marker 71 is 90° or more, and the timing at which the distance between the operation vehicle 10 and the marker 71 shortens is not generated, the position information of the marker 71 can be acquired based on an image captured when the distance to the marker 71 is short.

The moving direction determined by the moving direction determination unit 41 may be a direction in which the operation vehicle 10 does not come into contact with the marker 71, and the angle difference θg with respect to the direction from the current position of the operation vehicle 10 to the marker 71 is smaller than 45°. In this case, the timing at which the distance between the operation vehicle 10 and the marker 71 shortens is sufficiently generated during the movement of the operation vehicle 10 in the determined moving direction.

The survey unit 45 may determine whether acquisition of the position information of the marker 71 (marker 71-1) extracted by the image analysis unit 43 is completed. Upon determining that acquisition of the position information of the marker 71 (marker 71-1) is not completed, the survey unit 45 may start acquiring the position information of the marker 71 (marker 71-1). For example, the survey unit 45 may refer to the map 51 and determine the marker 71 with stored position information as the marker 71 for which the position information acquisition is completed. Alternatively, the survey unit 45 may determine the marker 71 for which the position information acquisition was executed a predetermined number of times as the marker 71 for which the position information acquisition is completed.

When the survey unit 45 starts acquiring the position information of the marker 71 for which the position information acquisition is not completed, the position information acquisition can be prevented from being executed again for the marker 71 for which the position information acquisition is already completed. As a result, for example, the power consumption of the battery 17 for the operation in the survey mode can be reduced.

If the received image includes a plurality of markers 71, the image analysis unit 43 extracts all the markers 71. The survey unit 45 determines whether the plurality of markers 71 extracted by the image analysis unit 43 include the marker 71 for which the position information acquisition is not completed. If the marker 71 for which the position information acquisition is not completed is included, the survey unit 45 starts acquiring the position information of the marker 71 of the highest visibility from the current position of the operation vehicle 10 out of the markers 71 for which the position information acquisition is not completed. The marker 71 of the highest visibility from the current position of the operation vehicle 10 may be, for example, the marker 71 whose size on the received image is largest. For example, the same procedure as described above is repeated until the marker 71 for which the position information acquisition is not completed is not included any more in the image captured by the camera 21 at the position where the acquisition of the position information of the marker 71 is completed.

More specifically, in the example shown in FIG. 7, assume that an image captured by the camera 21 when the operation vehicle 10 is located at the position 10-1 includes the four markers 71 (71-1, 71-2, 71-3, and 71-4) for which the position information acquisition is not completed. At this time, the image analysis unit 43 extracts the four markers 71 (71-1, 71-2, 71-3, and 71-4) included in the received image, and the survey unit 45 determines that the acquisition of the position information of the four markers 71 (71-1, 71-2, 71-3, and 71-4) is not completed. The survey unit 45 starts acquiring the position information of the marker 71-1 of the highest visibility from the current position (position 10-1) of the operation vehicle 10 out of the four markers 71 (71-1, 71-2, 71-3, and 71-4) for which the position information acquisition is not completed. Then, the moving direction determination unit 41 determines the moving direction of the operation vehicle 10. While the operation vehicle 10 is moving in the determined moving direction, the survey unit 45 acquires the position information of the marker 71-1.

After that, assume that an image captured by the camera 21 at a position (for example, a position 10-2) where the acquisition of the position information of the marker 71-1 is completed includes the four markers 71 (71-1, 71-2, 71-3, and 71-4). At this time, the image analysis unit 43 extracts the four markers 71 (71-1, 71-2, 71-3, and 71-4) included in the received image, and the survey unit 45 determines that the acquisition of the position information of the three markers 71 (71-2, 71-3, and 71-4) is not completed. The survey unit 45 starts acquiring the position information of the marker 71-2 of the highest visibility from the current position (position 10-2) of the operation vehicle 10 out of the three markers 71 (71-2, 71-3, and 71-4) for which the position information acquisition is not completed.

At a position (for example, a position 10-3) where the acquisition of the position information of the marker 71-2 is completed, acquisition of the position information of the marker 71-3 is started in accordance with the same procedure as described above. In addition, at a position (for example, a position 10-4) where the acquisition of the position information of the marker 71-3 is completed, acquisition of the position information of the marker 71-4 is started in accordance with the same procedure as described above. When starting the position information acquisition for any marker 71, the moving direction determined by the moving direction determination unit 41 is a direction in which the operation vehicle 10 does not come into contact with the marker 71, and the angle difference θg (θg1, θg2, θg3, or θg4) with respect to the direction from the current position of the operation vehicle 10 to the marker 71 is smaller than 90°.

If the survey unit 45 determines that an image captured by the camera 21 at a position (not shown) where the acquisition of the position information of the marker 71-4 is completed includes no marker 71 for which the position information acquisition is not completed, the operation vehicle 10 may end the operation in the survey mode. However, alternatively, for example, if the acquisition of the position information of all markers 71 is completed three times, the operation vehicle 10 may end the operation in the survey mode.

As described above, when an image captured by the camera 21 includes the plurality of markers 71, the survey unit 45 determines the marker 71 whose position information is to be acquired. Hence, the user need not determine the marker 71 whose position information is to be acquired. In addition, the survey unit 45 starts acquiring the position information of the marker 71 of the highest visibility from the current position of the operation vehicle 10 out of the markers 71 for which the position information acquisition is not completed. For example, as compared to a case in which the acquisition of the position information of the marker 71 farthest from the current position of the operation vehicle 10 is started, the moving distance needed until the position information acquisition is completed for all markers 71 is shortened. As a result, the power consumption of the battery 17 for the operation in the survey mode can be reduced.

An example of a series of procedures of the operation of the operation vehicle 10 in the survey mode will be described with reference to the flowchart of FIG. 8. In step S101, the camera 21 of the operation vehicle 10 captures the outside of the operation vehicle 10. In step S102, the image analysis unit 43 analyzes the image captured by the camera 21 and extracts the markers 71 included in the image. In step S103, the survey unit 45 determines whether the markers 71 extracted by the image analysis unit 43 include the marker 71 for which the position information acquisition is not completed.

If YES in step S103, the process advances to step S104. If NO in step S103, the procedure ends. In step S104, the survey unit 45 determines the marker 71 whose position information is to be acquired, and the moving direction determination unit 41 determines the moving direction of the operation vehicle 10. In step S105, the operation vehicle 10 starts moving in the moving direction determined by the moving direction determination unit 41, and during the movement of the operation vehicle 10 in the moving direction, the survey unit 45 acquires the position information of the marker 71 by the above-described triangulation.

In step S106, the survey unit 45 reflects the acquired position information of the marker 71 on the map 51 and updates the map 51. When the update of the map 51 ends, the process returns to step S101. That is, the processes of steps S101 to S106 are repeated until it is determined in step S103 that the markers 71 extracted by the image analysis unit 43 do not include the marker 71 for which the position information acquisition is not completed.

2-4. Accuracy of Position Information Acquisition

Figure 9:
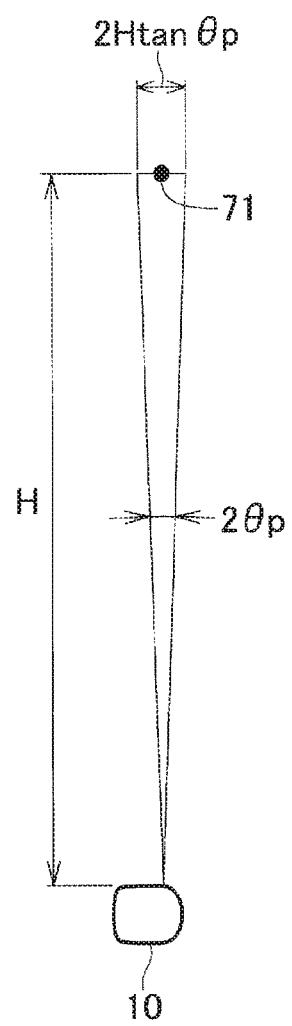
FIG. 9 is a view for explaining an error that occurs when a camera captures a marker.

The accuracy of acquisition of the position information of the marker 71 by the survey unit 45 will be described with reference to FIGS. 9 to 11B. FIG. 9 shows an example in which the operation vehicle 10 and the marker 71 are viewed from above. In the example shown in FIG. 9, the operation vehicle 10 and the marker 71 are spaced apart by a distance H.

Generally, in a camera capable of generating an image of a digital format, when forming an image of an object on the imaging plane of an image sensor, an error occurs because of the resolution of the image sensor, the focal length of the imaging lens, and the like. Under the influence of this error, an imaging error $\pm\theta p$ (the range of the imaging error is $2\theta p$) of a predetermined angle occurs when the camera 21 captures an image. When the imaging error $\pm\theta p$ occurs, the marker 71 spaced apart from the operation vehicle 10 by the distance H is captured while including an error in the range of $2H \tan \theta p$ on the real space. That is, the influence of the imaging error becomes large as the distance between the camera 21 and the marker 71 increases.

Figure 10A:
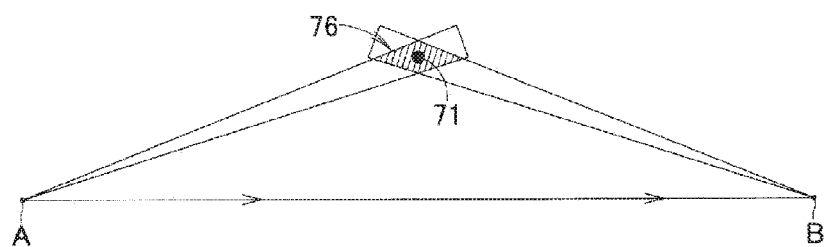
FIGS. 10A and 10B are views for explaining the accuracy of a survey by the survey unit shown in FIG. 4 considering an error that occurs when the camera captures a marker.
Figure 10B:
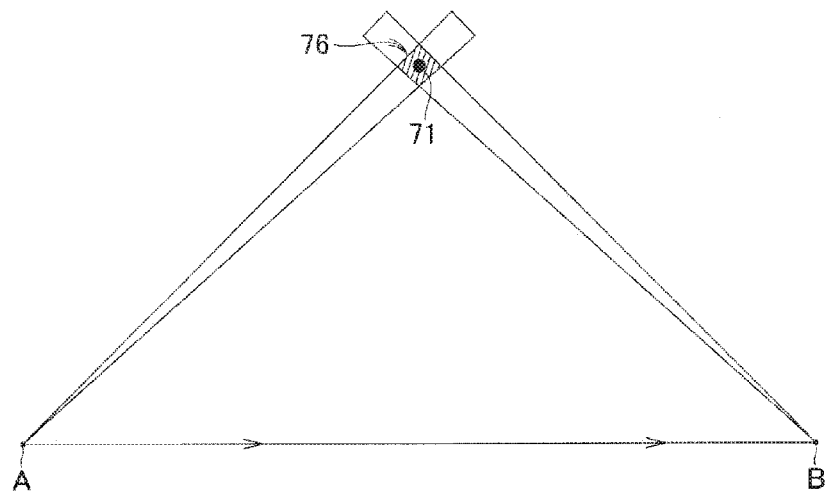

The influence of the imaging error in acquiring the position information of the marker 71 by triangulation will be described with reference to FIGS. 10A to 11B. A region 76 shown in FIGS. 10A and 10B represents the range of an error in acquiring the position information of the marker 71 using triangulation. The region 76 is a region formed by the overlap of an imaging error generated when capturing the marker 71 at a position A that is an example of the first point and an imaging error generated when capturing the marker 71 at a position B that is an example of the second point.

In the example shown in FIG. 10A and the example shown in FIG. 10B, the distance from the position A (first point) to the marker 71 and the distance from the position B (second point) to the marker 71 almost equal. However, the region 76 is smaller in FIG. 10B in which the angle made by the position A (first point), the marker 71, and the position B (second point) is close to 90° than in FIG. 10A. Note that the angle made by the position A (first point), the marker 71, and the position B (second point) is the same as the angle difference between the first angle and the second angle.

As described above, when the imaging error is taken into consideration, the accuracy of the acquisition of the position information of the marker 71 improves as the angle difference between the first angle and the second angle used in the triangulation becomes close to 90°. That is, the survey unit 45 determines the first point and/or the second point during the movement of the operation vehicle 10 in the moving direction such that the angle difference between the first angle and the second angle becomes close to 90°, thereby reducing the imaging error. As a result, the user need not determine the first point and the second point to guarantee the accuracy of the acquisition of the position information of the marker 71.

Figure 11A:
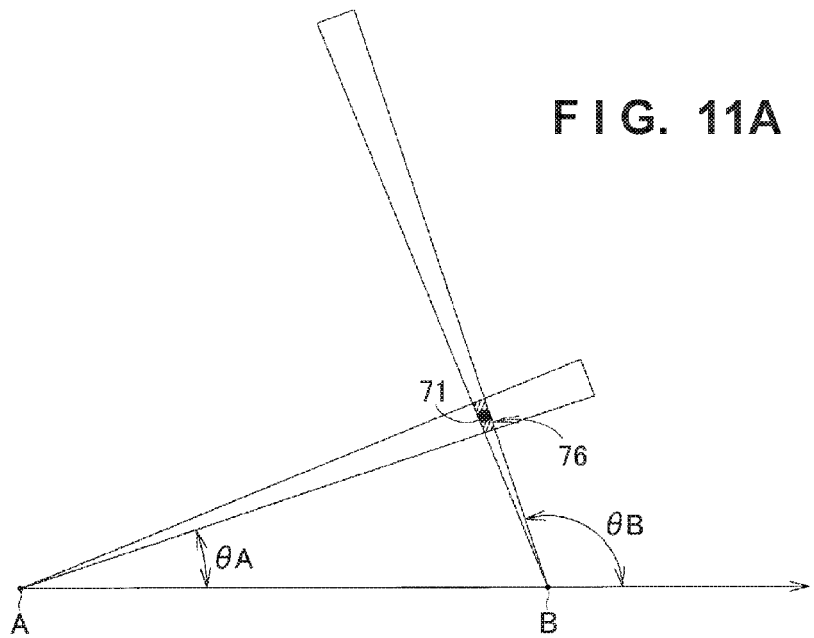
FIGS. 11A and 11B are views for explaining the accuracy of a survey by the survey unit shown in FIG. 4 considering an error that occurs when the camera captures a marker.
Figure 11B:
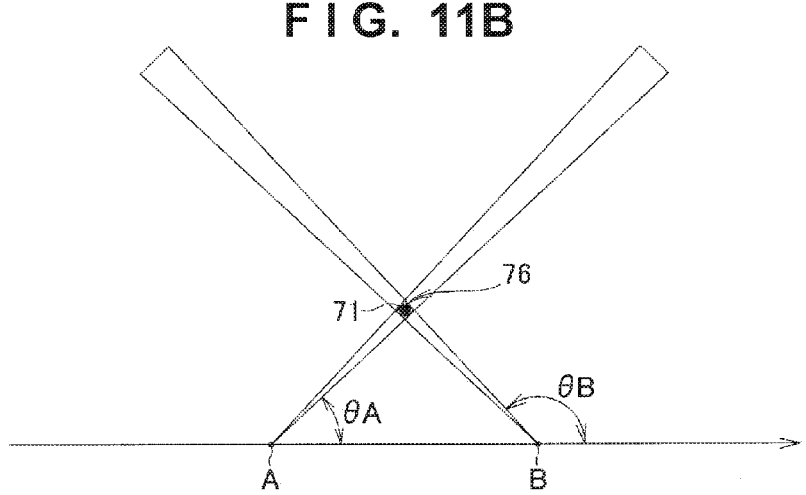

FIGS. 11A and 11B show two examples representing the accuracy of the acquisition of the position information of the marker 71 using triangulation in a case in which the angle difference between the first angle and the second angle is about 90°. The region 76 in FIG. 11A is larger than the region 76 in FIG. 11B. This is because the distance from the position A (first point) to the marker 71 in FIG. 11A is longer than the distance from the position A (first point) to the marker 71 in FIG. 11B, and therefore, the imaging error has a large influence.

In the case in which the angle difference between the first angle and the second angle is about 90°, both the distance between the first point and the marker 71 and the distance between the second point and the marker 71 are shortest under the condition that the first angle $\theta A$ of about 45° and the second angle $\theta B$ of about 135° hold, as shown in FIG. 11B. That is, during the movement of the operation vehicle 10 in the moving direction, the survey unit 45 determines the first point such that the first angle becomes close to 45° and also determines the second point such that the second angle becomes close to 135°, thereby improving the accuracy of the acquisition of the position information of the marker 71.

From the viewpoint of the accuracy of the acquisition of the position information of the marker 71 as well, the moving direction determined by the moving direction determination unit 41 when the survey unit 45 starts acquiring the position information of the marker 71 may be a direction in which the operation vehicle 10 does not come into contact with the marker 71, and the angle difference $\theta g$ with respect to the direction from the current position of the operation vehicle 10 to the marker 71 is smaller than 45°. That is, if the moving direction of the operation vehicle 10 is a direction in which the angle difference $\theta g$ with respect to the direction from the current position of the operation vehicle 10 to the marker 71 is smaller than 45°, during the movement, the operation vehicle 10 always passes through the first point at which the first angle is 45°.

2-5. Processing Concerning Acquisition of Position Information of Marker

Figure 12:
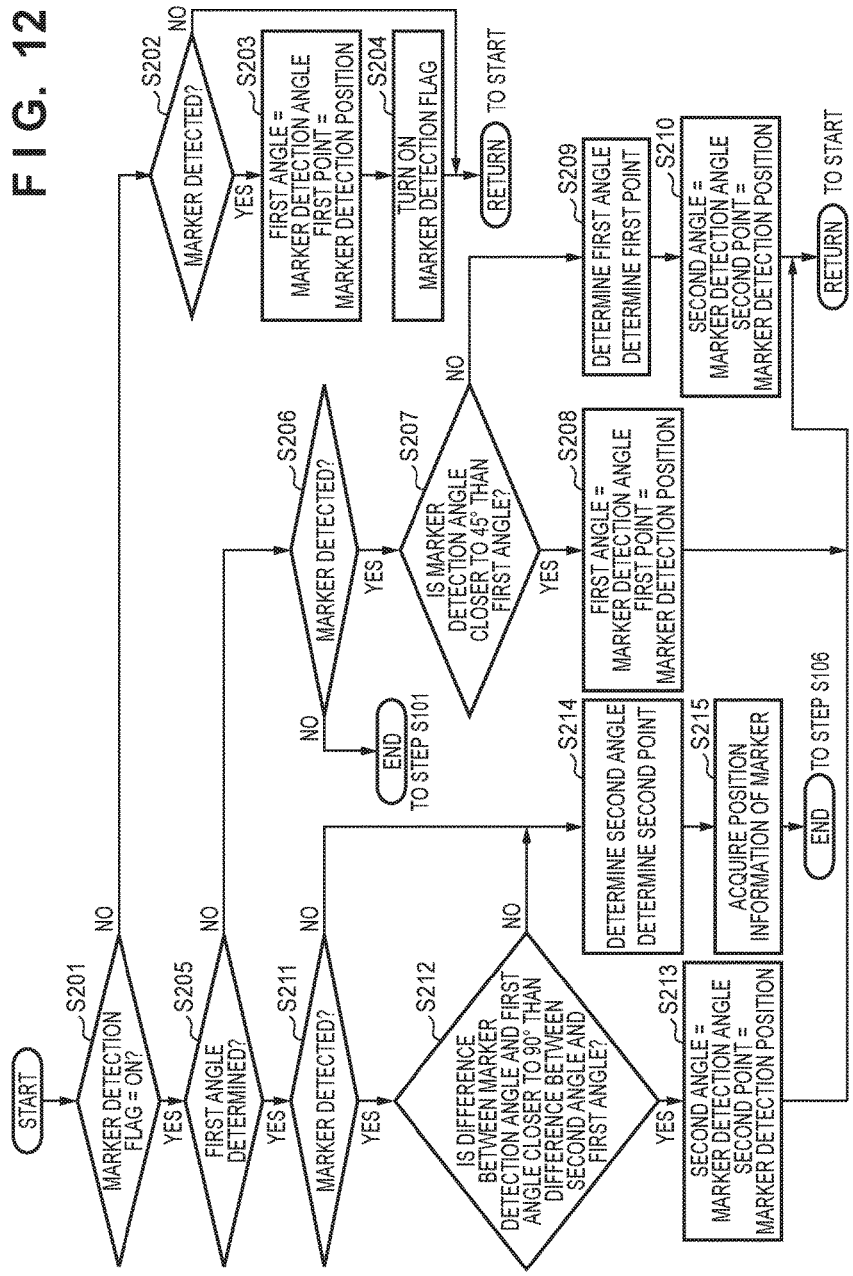
FIG. 12 is a flowchart showing an example of a detailed process of the step of acquiring the position information of the markers in the flowchart of FIG. 8.

An example of a detailed process of acquiring the position information of the marker 71 by the survey unit 45 will be described with reference to the flowchart of FIG. 12. The flowchart of FIG. 12 shows an example of a detailed process of step S105 in the flowchart of FIG. 8.

In step S201, the survey unit 45 determines whether a marker detection flag is ON. If YES in step S201, the process advances to step S205. If NO in step S201, the process advances to step S202. Note that immediately after the process advances from step S104 to step S105 in the flowchart of FIG. 8, the marker detection flag is OFF.

In step S202, the survey unit 45 determines whether an image captured by the camera 21 at the current position includes the marker 71. If YES in step S202, the process advances to step S203. If NO in step S202, the process returns to START.

In step S203, the survey unit 45 stores, as the first angle, the angle difference between the moving direction of the operation vehicle 10 at the position where the image determined in step S202 was captured and the direction from the operation vehicle 10 to the marker 71. The angle difference between the moving direction of the operation vehicle 10 at the position where the image was captured and the direction from the operation vehicle 10 to the marker 71 will also be referred to as a marker detection angle hereinafter. The survey unit 45 receives the marker detection angle from, for example, the image analysis unit 43. In step S203, the survey unit 45 also stores the position where the image determined in step S202 was captured as the first point. The position where the image was captured will also be referred to as a marker detection position hereinafter. The survey unit 45 receives the marker detection position from, for example, the behavior acquisition unit 44.

In step S204, the survey unit 45 turns on the marker detection flag. When the process of step S204 ends, the process returns to START. In step S205, the survey unit 45 determines whether the first angle is determined. If YES in step S205, the process advances to step S211. If NO in step S205, the process advances to step S206.

In step S206, the survey unit 45 determines whether an image captured by the camera 21 at the current position includes the marker 71. If YES in step S206, the process advances to step S207. If NO in step S206, the procedure ends. Note that if step S206 ends with NO, and the procedure ends, a situation in which the marker 71 that should be detectable cannot be detected due to some reason (the image analysis unit 43 cannot extract the marker 71) has occurred. Hence, the process returns to, for example, step S101 in the flowchart of FIG. 8.

In step S207, the survey unit 45 determines whether the marker detection angle at the position where the image determined in step S206 was captured is closer to 45° than the first angle. If YES in step S207, the process advances to step S208. If NO in step S207, the process advances to step S209.

In step S208, the survey unit 45 stores (overwrites) the marker detection angle at the position where the image determined in step S206 was captured newly as the first angle in place of the currently stored first angle. In step S208, the survey unit 45 also stores (overwrites) the position where the image determined in step S206 was captured newly as the first point in place of the currently stored first point.

In step S209, the survey unit 45 determines the currently stored first angle and the currently stored first point as the first angle and the first point to be used in triangulation. In step S210, the survey unit 45 stores the marker detection angle at the position where the image determined in step S206 was captured as the second angle, and stores the position where the image was captured as the second point. When the process of step S208 or S210 ends, the process returns to START.

By having the processes of steps S207, S208, and S209, the survey unit 45 can determine the first point during the movement of the operation vehicle 10 in the moving direction such that the first angle becomes close to 45°. As a result, the accuracy of the acquisition of the position information of the marker 71 improves.

In step S211, the survey unit 45 determines whether an image captured by the camera 21 at the current position includes the marker 71. If YES in step S211, the process advances to step S212. If NO in step S211, the process advances to step S214.

In step S212, the survey unit 45 determines whether the angle difference between the determined first angle and the marker detection angle at the position where the image determined in step S211 was captured is closer to 90° than the angle difference between the determined first angle and the currently stored second angle. If YES in step S212, the process advances to step S213. If NO in step S212, the process advances to step S214.

In step S213, the survey unit 45 stores the marker detection angle at the position where the image determined in step S211 was captured newly as the second angle in place of the currently stored second angle. In step S213, the survey unit 45 also stores the position where the image determined in step S211 was captured newly as the second point in place of the currently stored second point. When the process of step S213 ends, the process returns to START.

In step S214, the survey unit 45 determines the currently stored second angle and the currently stored second point as the second angle and the second point to be used in triangulation. In step S215, the survey unit 45 calculates and acquires the position information of the marker 71 by triangulation using the determined first angle, the determined second angle, and the distance between the determined first point and the determined second point. When the process of step S215 ends, the procedure ends. That is, when the process of step S215 ends, the process advances to step S106 in the flowchart of FIG. 8.

By having the processes of steps S212, S213, and S214, the survey unit 45 can determine the second point during the movement of the operation vehicle 10 in the moving direction such that the second angle becomes close to 135°. As a result, the accuracy of the acquisition of the position information of the marker 71 improves.

The flowchart of FIG. 12 is merely an example, and the survey unit 45 need not execute the processes of all steps. The survey unit 45 may execute, for example, processing for determining the first point, that is, processing corresponding to steps S201 to S209 in the flowchart of FIG. 12. In addition, the survey unit 45 may execute, for example, processing for determining the second point, that is, processing corresponding to steps S211 to S215 in the flowchart of FIG. 12.

2-6. Operation in Special Case

As an example of a special case, an example of an operation performed if a situation in which the marker 71 that should be extractable from an image captured by the camera 21 cannot be extracted by the image analysis unit 43 from an image captured by the camera 21 has occurred during the movement of the operation vehicle 10 will be described with reference to FIGS. 13 to 14D. The "situation in which the marker 71 that should be extractable from an image captured by the camera 21 cannot be extracted by the image analysis unit 43 from an image captured by the camera 21" will also be referred to as a lost hereinafter. The lost can occur when, for example, a tree, a rock, or the like whose position is fixed or a human, an animal, or the like whose position is not fixed stands as an obstacle 78 between the camera 21 and the marker 71. The lost can also occur due to, for example, backlight.

Figure 13:
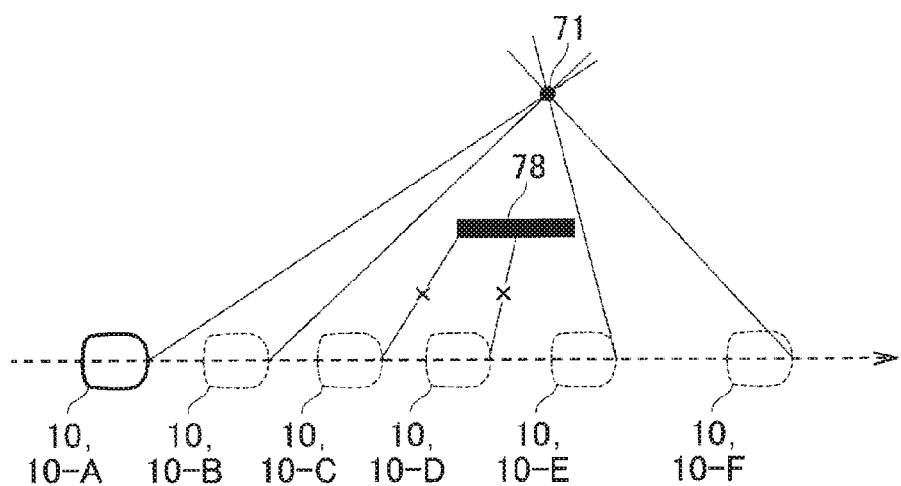
FIG. 13 is a view showing an example in which the automatic operation vehicle moves in a constant direction if an obstacle exists between a marker and the automatic operation vehicle shown in FIG. 1.

FIG. 13 shows an example in which the operation vehicle 10 that moves in a predetermined moving direction and the marker 71 are viewed from above. FIG. 13 also shows the obstacle 78. As shown in FIG. 13, the operation vehicle 10 and the marker 71 can be connected by a line from positions 10-A, 10-B, 10-E, and 10-F without an interference with the obstacle 78. On the other hand, as shown in FIG. 13, the operation vehicle 10 and the marker 71 cannot be connected by a line from positions 10-C and 10-D without an interference with the obstacle 78.

That is, for example, while the operation vehicle 10 is moving in the moving direction shown in FIG. 13 while capturing the outside by the camera 21, a situation (lost) in which the marker 71 extracted by the image analysis unit 43 from images captured at the positions 10-A and 10-B cannot be extracted by the image analysis unit 43 from an image captured at the position 10-C occurs. After that, when the operation vehicle 10 moves up to the position 10-E, the image analysis unit 43 can extract the marker 71 from a captured image again, and the lost is eliminated.

For example, if no measure is taken, the image analysis unit 43 is assumed to recognize the marker 71 extracted before the occurrence of the lost and the marker 71 extracted after the lost is eliminated as different markers 71. For example, if such a lost occurs during the time when the operation vehicle 10 moves to cause the survey unit 45 to acquire the position information of the marker 71, the survey unit 45 is assumed to be unable to accurately acquire the position information of the marker 71 or unable to acquire the position information of the marker 71. That is, information used by the survey unit 45 to acquire the position information of the marker 71 is limited to one of information (the marker detection angle and the marker detection position) obtained before the operation vehicle 10 reaches the position 10-C (before the occurrence of the lost) and information (the marker detection angle and the marker detection position) obtained after the operation vehicle 10 reaches the position 10-E (after the elimination of the lost).

For example, according to the flowchart of FIG. 12, step S211 ends with NO, or step S206 ends with NO. For example, if step S211 ends with NO, the second angle and the second point stored during the time when the operation vehicle 10 moves to the position 10-C are determined as the second angle and the second point to be used in triangulation (step S214), and the position information of the marker 71 is obtained by triangulation using them together with the already determined first angle and first point (step S215). In this case, there is a possibility that the position information of the marker 71 cannot accurately be acquired. If step S206 ends with NO, the procedure ends without acquiring the position information of the marker 71.

In the example shown in FIG. 13, when the operation vehicle 10 moves up to the position 10-E, the image analysis unit 43 can extract the marker 71 from a captured image again. Hence, the image analysis unit 43 may determine whether the marker 71 extracted before the occurrence of the lost and the marker 71 extracted after the elimination of the lost are the same marker 71. If the marker 71 extracted by the image analysis unit 43 before the occurrence of the lost and the marker 71 extracted after the elimination of the lost are the same marker 71, the survey unit 45 may acquire the position information of the marker 71 using both the information (the marker detection angle and the marker detection position) obtained before the occurrence of the lost and the information (the marker detection angle and the marker detection position) obtained after the elimination of the lost.

Then, as compared to a case in which the survey unit 45 acquires the position information of the marker 71 using only one of the information obtained before the occurrence of the lost and the information obtained after the elimination of the lost, the position information of the marker 71 can accurately be acquired. In addition, for example, during the movement of the operation vehicle 10, the user need not guide the operation vehicle 10 up to a position without an influence of the obstacle 78.

An example of a method of allowing the image analysis unit 43 to determine whether the marker 71 extracted after the elimination of the lost and the marker 71 extracted before the occurrence of the lost are the same marker 71 if the lost occurs and is eliminated will be described with reference to FIGS. 14A to 14D.

Figure 14A:
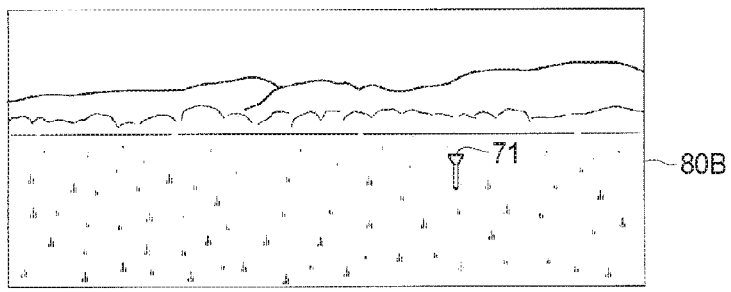
FIGS. 14A to 14D are views showing an example of image analysis by an image analysis unit shown in FIG. 4 in the state shown in FIG. 13.
Figure 14B:
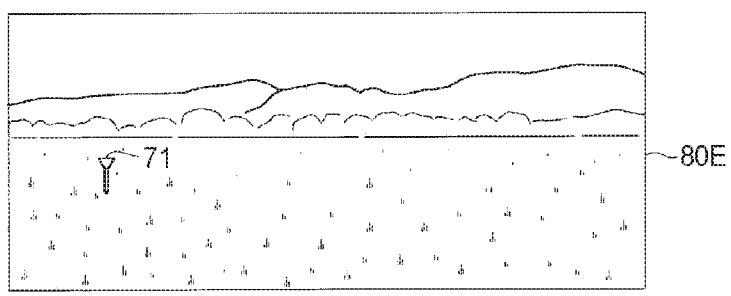
Figure 14C:
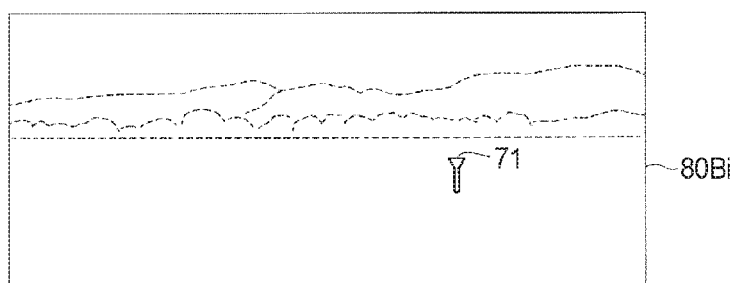
Figure 14D:
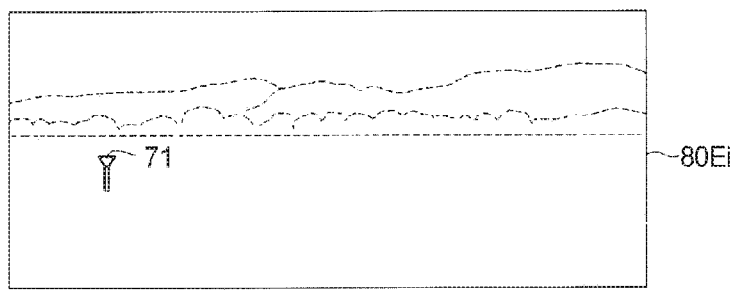

As an example of an image captured by the camera 21 before the occurrence of the lost, FIG. 14A shows an image 80B captured at the position 10-B in the example of FIG. 13. As an example of an image captured by the camera 21 after the elimination of the lost, FIG. 14B shows an image 80E captured at the position 10-E in the example of FIG. 13. FIG. 14C shows a processed image 80Bi as an example of an image for which the image analysis unit 43 has performed image processing of removing elements other than the marker 71 from the image 80B. FIG. 14D shows a processed image 80Ei as an example of an image for which the image analysis unit 43 has performed image processing of removing elements other than the marker 71 from the image 80E. Note that FIGS. 14A to 14D do not illustrate the obstacle 78.

As an example of the method, the image analysis unit 43 may compare the shape feature of the landscape near the marker 71 on the image 80B with the shape feature of the landscape near the marker 71 on the image 80E. The image analysis unit 43 may determine based on the comparison result whether the marker 71 included in the image 80B and the marker 71 included in the image 80E are the same marker 71. According to this example of the method, the shape feature of the landscape near the marker 71 can be used for the determination. This is effective when, for example, a characteristic object (for example, a tree) is included in the landscape near the marker 71. This method also provides the effect of guaranteeing the accuracy of determination even in a case in which it is difficult to determine the matching using only the shape feature of the marker 71, for example, in a case in which an image captured after the elimination of the lost includes a plurality of markers 71 having the same shape.

As another example of the method, the image analysis unit 43 may predict a position where the marker 71 included in the image 80B is included in the image 80E using the distance between the position 10-B in the example of FIG. 13 and the position 10-E in the example of FIG. 13 and compare the predicted position of the marker 71 on the image 80E with the actual position of the marker 71 on the image 80E. The image analysis unit 43 may determine based on the comparison result whether the marker 71 included in the image 80B and the marker 71 included in the image 80E are the same marker 71. According to this example of the method, the distance of the movement of the operation vehicle 10 can be used for the determination. This method provides the effect of guaranteeing the accuracy of determination even in a case in which it is difficult to determine the matching using only the shape feature of the marker 71, for example, in a case in which an image captured after the elimination of the lost includes a plurality of markers 71 having the same shape.

As still another example of the method, the image analysis unit 43 may compare the shape feature of the marker 71 on the processed image 80Bi with the shape feature of the marker 71 on the processed image 80Ei. The image analysis unit 43 may determine based on the comparison result whether the marker 71 included in the image 80B and the marker 71 included in the image 80E are the same marker 71. According to this example of the method, the shape feature of the marker 71 can be used for the determination. This is particularly effective when, for example, the marker 71 has a characteristic shape.

As yet another example of the method, the image analysis unit 43 may predict a position where the marker 71 included in the processed image 80Bi is included in the processed image 80Ei using the distance between the position 10-B in the example of FIG. 13 and the position 10-E in the example of FIG. 13 and compare the predicted position of the marker 71 on the processed image 80Ei with the actual position of the marker 71 on the processed image 80Ei. The image analysis unit 43 may determine based on the comparison result whether the marker 71 included in the image 80B and the marker 71 included in the image 80E are the same marker 71. According to this example of the method, the distance of the movement of the operation vehicle 10 can be used for the determination. This method provides the effect of guaranteeing the accuracy of determination even in a case in which it is difficult to determine the matching using only the shape feature of the marker 71, for example, in a case in which an image captured after the elimination of the lost includes a plurality of markers 71 having the same shape.

Several examples of the method of allowing the image analysis unit 43 to determine whether the marker 71 extracted after the elimination of the lost and the marker 71 extracted before the occurrence of the lost are the same marker 71 if the lost occurs and is eliminated have been described. The image analysis unit 43 may make a determination using a result obtained by solely executing one of the methods, or may make a general determination using a result obtained by executing two or more of the methods. The image analysis unit 43 may execute a method other than those described above and make a general determination in consideration of the result as well.

Not all the operations of the operation vehicle 10 described above need be executed. That is, the operation vehicle 10 may execute part of the examples of the operation described above.

The present invention is not limited to the above-described exemplary embodiments, and those skilled in the art can easily change the above-described exemplary embodiments within the range included in the scope of the appended claims.

A first aspect according to the present invention is directed to an automatic operation vehicle that automatically performs an operation in an operation area, comprising:
a moving direction determination unit configured to determine a moving direction of the automatic operation vehicle;
an image analysis unit configured to extract a marker included in an image captured by a camera provided on the automatic operation vehicle; and
a survey unit configured to acquire, by triangulation, position information of the marker extracted by the image analysis unit,
wherein when the survey unit starts acquiring the position information of the marker,
the moving direction determination unit determines, as the moving direction, a direction in which the automatic operation vehicle does not come into contact with the marker, and an angle difference with respect to a direction from a current position of the automatic operation vehicle to the marker is smaller than 90°.

When the survey unit starts acquiring the position information of the marker, the moving direction determination unit determines the moving direction of the automatic operation vehicle. It is therefore possible to acquire the position information of the marker without causing the user to acquire the position information of the marker by himself/herself and guide the moving direction of the automatic operation vehicle.

In a second aspect according to the present invention, in addition to the first aspect, the survey unit may determine whether the acquisition of the position information of the marker extracted by the image analysis unit is completed, and start acquiring the position information of the marker for which it is determined that the acquisition of the position information is not completed.

When the survey unit starts acquiring the position information of the marker for which the position information acquisition is not completed, it is possible to prevent the position information acquisition from being executed again for a marker for which the position information acquisition is already completed.

In a third aspect according to the present invention, in addition to the first aspect, if the image analysis unit simultaneously extracts two or more markers,
the survey unit may determine whether the acquisition of the position information of all the markers extracted by the image analysis unit is completed, and start acquiring the position information of the marker of a highest visibility from the current position of the automatic operation vehicle out of the markers for which it is determined that the acquisition of the position information is not completed.

The survey unit starts acquiring the position information of the marker of the highest visibility from the current position of the automatic operation vehicle out of the markers for which the position information acquisition is not completed. For example, as compared to a case in which the acquisition of the position information of the marker farthest from the current position is started, the moving distance needed until the position information acquisition is completed for all markers is shortened.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-055416, filed Mar. 18, 2016, which is hereby incorporated by reference herein in its entirety.

What is claimed is:

1. An automatic operation vehicle that automatically performs an operation in an operation area, the vehicle comprising:

a moving direction determination circuit configured to determine a moving direction of the automatic operation vehicle;

an image analysis circuit configured to extract a marker included in an image captured by a camera provided on the automatic operation vehicle; and a survey circuit configured to acquire, by triangulation, position information of the marker extracted by the image analysis circuit, wherein when the survey circuit starts acquiring the position information of the marker, the moving direction determination circuit determines, as the moving direction, a direction in which the automatic operation vehicle does not come into contact with the marker, and an angle difference with respect to a direction from a current position of the automatic operation vehicle to the marker is smaller than 90°.

2. The vehicle according to claim 1, wherein the survey circuit determines whether the acquisition of the position information of the marker extracted by the image analysis circuit is completed, and starts acquiring the position information of the marker for which it is determined that the acquisition of the position information is not completed.

3. The vehicle according to claim 1, wherein if the image analysis circuit simultaneously extracts two or more markers, the survey circuit determines whether the acquisition of the position information of all the markers extracted by the image analysis circuit is completed, and starts acquiring the position information of the marker of a highest visibility from the current position of the automatic operation vehicle out of the markers for which it is determined that the acquisition of the position information is not completed.

4. A method of controlling an automatic operation vehicle that automatically performs an operation in an operation area, the method being performed by the automatic operation vehicle, the method comprising:

determining a moving direction of the automatic operation vehicle;

extracting a marker included in an image captured by a camera provided on the automatic operation vehicle; and acquiring, by triangulation, position information of the extracted marker, wherein the determining the moving direction includes, when starting acquiring the position information of the marker, determining, as the moving direction, a direction in which the automatic operation vehicle does not come into contact with the marker, and an angle difference with respect to a direction from a current position of the automatic operation vehicle to the marker is smaller than 90°.

5. An automatic operation vehicle that automatically performs an operation in an operation area, the vehicle comprising:

one or more processors;

memory; and one or more programs stored in the memory and configured to be executed by the one or more processors, the programs including instructions for:

determining a moving direction of the automatic operation vehicle;

extracting a marker included in an image captured by a camera provided on the automatic operation vehicle; and acquiring, by triangulation, position information of the extracted marker, wherein the determining the moving direction includes, when starting acquiring the position information of the marker, determining, as the moving direction, a direction in which the automatic operation vehicle does not come into contact with the marker, and an angle difference with respect to a direction from a current position of the automatic operation vehicle to the marker is smaller than 90°.

6. A non-transitory computer readable medium storing a program causing an automatic operation vehicle that automatically performs an operation in an operation area, to execute a process, the process comprising:

determining a moving direction of the automatic operation vehicle;

extracting a marker included in an image captured by a camera provided on the automatic operation vehicle; and acquiring, by triangulation, position information of the extracted marker, wherein the determining the moving direction includes, when starting acquiring the position information of the marker, determining, as the moving direction, a direction in which the automatic operation vehicle does not come into contact with the marker, and an angle difference with respect to a direction from a current position of the automatic operation vehicle to the marker is smaller than 90°.

* * * * *